Patented Jan. 21, 1941

2,229,024

UNITED STATES PATENT OFFICE 2,229,024

AROMATIC ETHER OF POLYALKOXYALKYL-ALKYLENE POLYAMINES AND PROCESS FOR OBTAINING THEM

Herman A. Bruson, Philadelphia, Pa., assignor to Röhm & Haas Company, Philadelphia, Pa.

No Drawing. Application May 23, 1939, Serial No. 275,157

9 Claims. (Cl. 260—268)

This invention relates to new amines and their salts and to the quaternary ammonium bases and salts derived from these amines. It also relates to a process for preparing these new compounds. It relates more particularly to the water-soluble salts and bases which have been found to be excellent wetting, emulsifying, dispersing, and cleaning agents which may be generally classed as capillary active compounds.

This application is a continuation-in-part of application Serial No. 82,184 filed May 28, 1936, now Patent No. 2,170,111, granted August 22 1939.

The amines are those having the general structure—

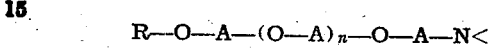

in which R is an aromatic radical containing an aromatic nucleus at its point of attachment to the ether oxygen atom, A is an alkylene radical having more than one carbon atom, $n$ is equal to one (1) or zero (0), and N is the nitrogen atom derived from ammonia, a primary or secondary aliphatic, cycloaliphatic, arylaliphatic or hydroxyaliphatic amine or secondary heterocyclic amine.

These amines are readily prepared by condensing one mol each of a monohydric phenol and a polyalkylene ether, having a halogen substituent on each of its terminal carbon atoms, in the presence of an alkaline condensing agent, reacting the product thus obtained with ammonia, a primary or secondary amine and treating the resulting amine hydrohalide with an alkali or alkaline earth hydroxide.

The reactions involved may be outlined as follows—

(1) R—OH+X—A—(O—A)$_n$—O—A—X+NaOH ⟶
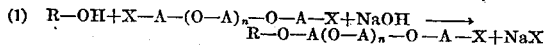

(2) R—O—A—(O—A)$_n$O—A—X+N— ⟶
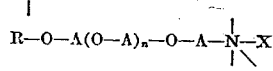
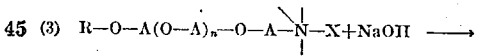

(3) R—O—A(O—A)$_n$—O—A—N—X+NaOH ⟶
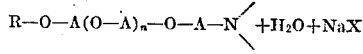

in which X is a halogen atom.

Quaternary ammonium salts corresponding to these amines may be made by treating a tertiary amine having as a substituent the radical R—O—A(OA)$_n$—O—A— with an alkylating agent such as an alkyl chloride, dialkyl sulfate, aralkyl chloride, etc. Alternatively the quaternary ammonium salts may be obtained by treating a tertiary amine with the phenolic complex ether chloride. The bases may be obtained from these salts by treatment with caustic.

In preparing the complex ether halide as in Equation 1 a monohydric phenol is treated with at least an equimolecular quantity of a dihalogeno ether in which each of the halogen atoms is attached to a terminal methylene group, in the presence of at least an equimolecular proportion of an alkali hydroxide. This mixture is heated at about 100 to 140° C. until the reaction is complete. The time of heating may vary from two to more than fifteen hours, depending on the reactants. The temperature at which the reaction is carried out will also vary somewhat according to the actual materials involved. When the reaction is complete, the alkali halide is filtered off. The product is usually a liquid of relatively high boiling point which may be purified by distillation in vacuo. Methods of preparing suitable ether chlorides are described in detail in applicant's prior U. S. Patents 2,097,441; 2,098,203; 2,098,204; 2,148,432 and 2,132,675, and in copending application Serial No. 198,696 filed March 29, 1938, now Patent No. 2,176,834 granted October 17, 1939.

In order to prepare the amine or quaternary ammonium salt this halogenated complex ether is heated with ammonia or the desired primary, secondary or tertiary amine until the reaction is complete. This usually requires from about one to fifteen or more hours at temperatures ranging from about 75 to about 180° C., depending on the nature and reactivity of the ingredients. A fixed alkali may be present during the reaction or the product may be treated with an alkali hydroxide to set free the base which may be separated from the alkali halide and purified as by washing or by distillation in vacuo. In many cases reaction products may be used directly since, as salts of the amines or of the quaternary ammonium bases, they are soluble in water. The free base may then be converted to a salt by treatment with an organic or inorganic acid such as, for example, acetic, formic, lactic, acrylic, propionic, crotonic, phosphoric, sulfuric, hydrochloric, etc. In case it is desired to convert the amine to a quaternary ammonium compound, it may be treated with an alkylating or aralkylating agent such as benzyl chloride, dimethyl sulfate, diethyl sulfate, dimethyl oxalate, methallyl chloride, methyl iodide, ethyl bromide, methyl thiocyanate, benzyl thiocyanate, and other similar ones.

The phenols which can be used for the purpose of this invention include the following:

Phenol, o-, m-, or p-cresol, thymol, carvacrol, p-ter-butylphenol, p-sec-butylphenol, p-ter-amylphenol, p-n-amylphenol, n-amyl-m-cresol, p-sec-octylphenol, p-ter-octylphenol, p-sec-hexylphenol, dodecylphenol, o-, m-, or p-cyclohexylphenol, o-, m-, or p-phenylphenol, o- or p-benzylphenol, α- or β-naphthol, ter-butyl-β-naphthol, ter-octyl-β-naphthol, 1, 3, 5-xylenol, o-chlorophenol, 2, 4-dibromophenol, camphylphenol, and various acyl phenols such as benzoyl phenol, lauroyl phenol, etc. The most useful products are those derived from p-alkylated or cycloalkylated phenols in which the alkyl or cycloalkyl group contains from 4 to 12 carbon atoms inclusive since these compounds show the highest degree of capillary activity. The alkyl group may be a straight or branched chain.

Among the dihalogeno-polyalkylene ethers which can be used may be mentioned β, β'-dichloro-diethyl ether, β, β'-dichloro-diisopropyl ether, dichloro-dibutylether, dichlorodiamyl ether, and the corresponding dibromo derivatives, β-chloroethyl-β'-chloroethoxyethyl ether, and their higher homologs containing up to 18 carbon atoms.

The compounds used for the amination of the monohalogeno-polyalkylene ethers of the phenols used can be ammonia or primary, secondary, and tertiary amines. Typical useful amines for the purpose are mono-, di-, or trimethylamine, mono-, di-, or triethylamine, or their higher homologs, such as dodecyl methylamine and octadecyl ethylamine: monoethanolamine, diethanolamine, pentanol amine, dibenzylamine, cyclohexylamine, dicylohexylamine, piperidine, morpholine, benzyl-dimethylamine; various polyamines, such as ethylene diamine, diethylene triamine, triethylene tetramine, tetraethylene pentamine, hydroxyethyl ethylene diamine, piperazine; and various ether amines such as phenoxy ethyl amine and the primary or secondary amines obtained according to the present invention.

The following examples are given to illustrate the invention which, however, is not limited to the exact conditions of time, temperature, concentration, etc. shown, nor to the exact ingredients, as it may be otherwise practiced within the scope of the appended claims.

*Example 1*

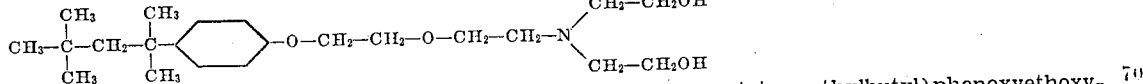

A mixture of 103 grams of p-(α,α,γ,γ-tetramethylbutyl) phenol, 22 grams of sodium hydroxide, 20 cc. of water, and 286 grams of β,β'-dichlorodiethyl ether was heated under a reflux condenser at 115–120° C. for 6½ hours while stirring continuously. The sodium chloride formed was filtered off and the p-(α,α,γ,γ-tetramethylbutyl) phenoxyethoxyethyl chloride—

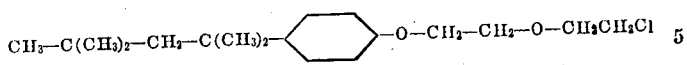

boiling at 177–178° C./4 mm. was isolated as a colorless oil by distillation of the filtrate in vacuo.

A mixture of 39 grams of the p-(α,α,γ,γ-tetramethylbutyl) phenoxyethoxyethyl chloride thus obtained and 26 grams of diethanolamine was heated for 15½ hours on an oil bath at 120–135° C. under a reflux condenser while stirring. The thick brown oil obtained was mixed with 80 cc. of 10% caustic soda solution, 100 cc. of water and 150 cc. toluene and warmed for one-half hour on a water bath of 60–70° C. The toluene layer was then separated and washed with 100 cc. of water. After distillation of the toluene and fractionation of the residual oil in vacuo, the p-(α,α,γ,γ-tetramethylbutyl) phenoxyethoxyethyl-diethanolamine was obtained as a pale yellow viscous oil in a yield of 82% of theory. It boiled at 255–260° C./5 mm.

This oil when dissolved in 10% phosphoric acid gave a clear solution which was very foamy, soapy, and lathery when shaken. Such solutions can be used for wetting out metal surfaces as in the cleaning of steel automobile bodies with phosphoric acid or for rustproofing steel with metal phosphate-phosphoric acid solutions.

*Example 2*

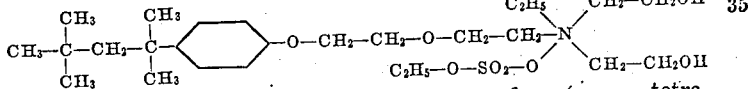

A solution of 30 grams of p-(α,α,γ,γ-tetramethylbutyl) phenoxyethyl-diethanolamine in 50 grams of toluene was mixed with a solution of 12.5 grams of diethylsulfate in 25 grams of toluene, and the mixture heated for one hour at 80–85° C. The clear solution obtained was then evaporated under reduced pressure at 40–50° C. to remove the toluene. The residual quaternary ammonium compound was a viscous amber-colored oil which dissolved readily in water to give a clear, foamy, soapy solution, useful as a wetting-out agent and which was stable to hard water. The quaternary ammonium base can be liberated by treatment with alcoholic potassium hydroxide.

*Example 3*

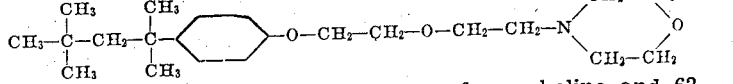

A mixture of 25 grams of morpholine and 62 grams of p-(α,α,γ,γ-tetramethylbutyl) phenoxyethoxyethyl chloride was heated under reflux for 7 hours at 100–120° C. The reaction mixture was made alkaline with caustic soda solution, and the oil layer separated and washed. Upon fractionating this oil in vacuo an 83% yield of p-(α,α,γ,γ-tetramethylbutyl) phenoxyethoxyethyl-N-morpholine was obtained as a pale yellow oil boiling at 203–208° C./4 mm.

It dissolved readily in 10% solutions of lactic, phosphoric, oxalic, or acetic acids, and these solutions gave heavy foams when shaken.

Upon treating 36 grams of p-(α,α,γ,γ-tetramethylbutyl) phenoxyethoxyethyl-N-morpholine with 16 grams of diethyl sulfate in toluene as described in Example 2, the corresponding compound—

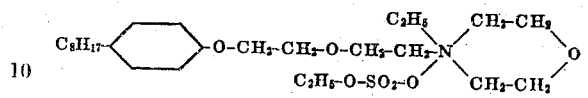

was obtained. It is a viscous, pale yellow mass which dissolves readily in water to give a foamy, soapy solution. The quaternary ammonium base can be liberated by treatment with alcoholic barium hydroxide solution.

*Example 4*

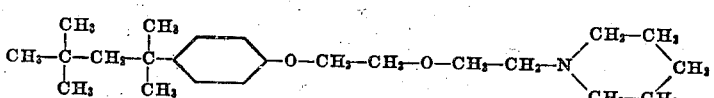

This compound was prepared by heating a mixture of 62.5 grams of p-(α,α,γ,γ-tetramethylbutyl)phenoxyethoxyethyl chloride with 17 grams of piperidine at 130–140° C. for 10 hours, liberating the base with caustic soda, and fractionating in vacuo, as described in Example 3. The compound was obtained in an 80% yield, as a yellow oil boiling at 185–200° C./1 mm., which upon cooling solidified to a waxy, crystalline mass.

It dissolved readily in 10% phosphoric acid to form a soap-like, foamy solution.

One molecular equivalent of the above amine in an equal volume of benzene was mixed with one molecular equivalent of benzyl chloride. The mixture was warmed 1 hour at 75° C. and the benzene distilled off under reduced pressure. The residue of p-(α,α,γ,γ-tetramethylbutyl) phenoxyethoxyethyl-N-benzyl-piperidinium chloride is useful as a spreader for insecticides. The quaternary ammonium base is liberated by treatment with alcoholic caustic soda solution. By substituting p-tertiary butyl phenoxyethoxyethyl chloride for the p-tertiary octyl compound in the foregoing example, the N-p-tertiary butyl phenoxyethoxyethyl piperidine is formed which can then be converted into the corresponding quaternary piperidinium salts.

*Example 5*

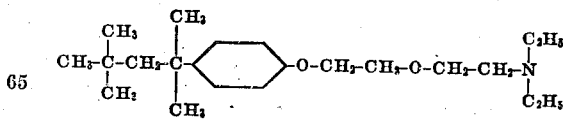

This compound was prepared by heating a mixture of 52 grams of p-(α,α,γ,γ-tetramethylbutyl) phenoxyethoxyethyl chloride with 25 grams of diethylamine under reflux for 9 hours on a boiling water bath. The base was liberated with dilute caustic soda solution. It separated as a yellowish oil boiling at 210–220° C./10 mm. Upon treatment with dimethyl sulfate it gave a water-soluble, soap like body having the formula—

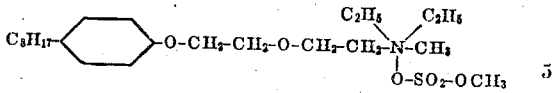

The analogous diamylamine derivative obtained from technical diamylamine and p-(α,α,γ,γ-tetramethylbutyl)phenoxyethoxyethyl chloride boiled at 220–240° C./6 mm. Its phosphate gave a very foamy solution in water.

*Example 6*

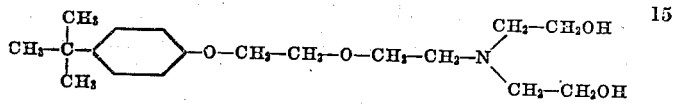

31 grams of diethanolamine was mixed with 51.5 grams of p-ter-butylphenoxyethoxyethyl chloride, a colorless oil boiling at 184–186° C./10 mm. which was prepared from p-ter-butylphenol, 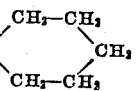β,β'-dichlorodiethyl ether, and caustic soda, according to the procedure set forth in Example 1. The mixture was heated at 115–135° C. for 10 hours and then made alkaline with 90 cc. of 10% caustic soda solution. The p-ter-butylphenoxyethoxyethyl-diethanolamine separated as an oil which after washing and fractionating in vacuo is a pale yellow oil boiling at 265° C./10 mm. Yield 71% of theory.

The acetate, phosphate, and lactate of this base dissolve in water to give foamy solutions having low surface tensions. The quaternary ammonium compounds derived from the above base and diethyl sulfate, dimethyl sulfate, or benzyl chloride are water-soluble capillary active compounds.

*Example 7*

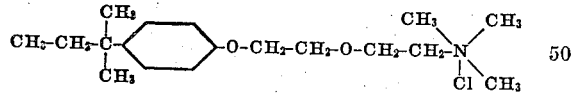

A mixture of 27 grams of p-ter-amylphenoxyethoxyethyl chloride and 13.8 grams of trimethylamine was heated in a sealed tube at 150–160° C. for 2 hours. The crystalline mass obtained after evaporation of the excess trimethylamine is the quaternary ammonium chloride having the above formula. Its aqueous solution yields a stable heavy foam and is useful for fixing direct dyestuffs on the fiber. Upon treatment with alcoholic potassium hydroxide the quaternary ammonium hydroxide is formed.

*Example 8*

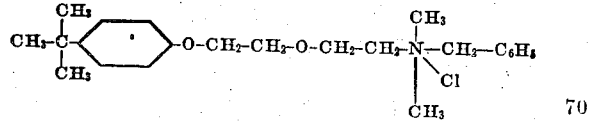

A mixture of 20.8 grams of p-ter-butylphenoxyethoxyethyl chloride and 11 grams of benzyl dimethylamine was heated under a reflux condenser for 2 hours at 150° C. The clear, viscous mass obtained is the quaternary ammonium chloride having the above formula. Its aqueous solution is foamy and soap-like and may be used as a penetrating agent. The corresponding quaternary ammonium hydroxide is formed by treatment with alcoholic sodium hydroxide solution.

*Example 9*

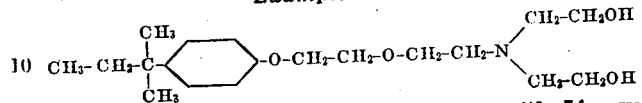

31 grams of diethanolamine was mixed with 54 grams of p-ter-amylphenoxyethoxyethyl chloride, a colorless oil boiling at 153-155° C./3 mm. which was prepared from p-ter-amyl phenol, β,β'-di- CH₃—C(CH₃)₂—CH₂—C(CH₃)₂—⟨C₆H₄⟩—O—CH₂—CH₂—O—CH₂—CH₂—Cl chlorodiethyl ether, and caustic soda, according to the procedure set forth in Example 1. The mixture was heated at 100–135° C. for 8 hours, then made alkaline, and the oil separated, washed and fractionated. The p-ter-amyl-phenoxyethoxyethyl-diethanolamine distilled at 240–245° C./4 mm. as a pale yellow oil. Its oxalate, lactate and phosphate are readily soluble in water to give foamy, soapy solutions useful as penetrating agents.

Upon condensing the above amine with a molecularly equivalent quantity of diethyl sulfate as described in Example 2, the p-ter-amylphenoxyethoxyethyl - dihydroxydiethyl-ethyl ammonium sulfuric ethyl ester—

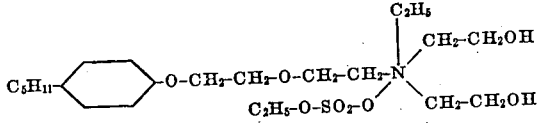

was obtained as a pale yellow oil. Its aqueous solution is suitable as a wetting-out agent for cotton yarn.

*Example 10*

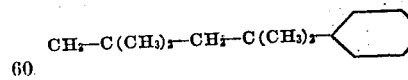

A mixture of 1 mol equivalent α,α,γ,γ-tetramethyl-butylphenoxyethoxyethyl chloride and 2 mols (excess) of dimethylamine was heated in an autoclave 5 hours at 180° C. The reaction mass was made alkaline with caustic soda solution and the free base isolated by distillation in vacuo after removal of unreacted dimethylamine. It was a colorless oil boiling at 191–194° C./3 mm.

This oil was heated with a molecularly equivalent quantity of diethyl sulfate in dry benzene on a water bath for 1 hour. Upon evaporation of the solvent, the ter-octylphenoxyethoxyethyl-dimethylethyl ammonium ethyl sulfate was left as a thick syrup. Its aqueous solution possesses a soap-like character and is useful for fixing acid dyes on the fiber. By substituting p-tertiary amyl phenoxyethoxyethyl chloride for the p-tertiary octyl compound in the foregoing example, the p-tertiary amyl phenoxyethoxyethyl dimethylamine may be prepared. This can then be converted to the corresponding quaternary ammonium compounds.

*Example 11*

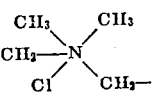

A mixture of 32 grams of p-(α,α,γ,γ-tetramethyl-butyl) phenoxyethoxyethyl - dimethylamine and 12.7 parts of benzyl chloride was warmed to 50 grams of benzene for 2 hours. The benzene was then evaporated. The residual viscous mass gave a foamy, soapy solution in water.

*Example 12*

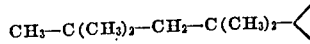

A mixture of 51.5 grams of p-(α,α,γ,γ-tetramethyl-butyl) phenol, 11.7 grams of sodium hydroxide, 20 cc. of water and 171 grams of β,β'-dichloro-diisopropyl ether was heated at 110–120° C. with rapid agitation under a reflux condenser for 9 hours. The product was worked up as in Example 1, yielding 50 grams of ter-octyl phenoxyiso-propoxy-isopropyl chloride. (Colorless oil B. P. 190–195° C./5 mm.).

This oil was converted to the tertiary amine salt by heating it with excess of dimethylamine at 130–140° C. in an autoclave for 2 hours. The product was treated with excess caustic soda solution and the free base isolated by distillation under reduced pressure. It formed a colorless oil boiling at 195–200° C./3 mm. Yield 70% of theory.

Upon treatment of this base with one molecular equivalent of dimethyl sulfate, the water-soluble quaternary ammonium salt was obtained having cation active properties. It readily combines with Congo Red dye to form an insoluble lake and is useful for improving the fastness to washing of direct dyes.

*Example 13*

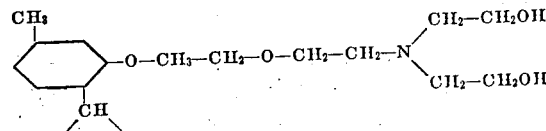

41.5 grams of diethanolamine was mixed with 51.5 grams of thymoxyethoxyethyl chloride, a colorless oil boiling at 176-178° C./10 mm. which was prepared from thymol, caustic soda and $\beta,\beta'$-dichlorodiethyl ether, according to the procedure set forth in Example 1. The mixture was heated 15 hours at 110-130° C., then made alkaline; and the base which separated as an oil was washed and fractionated in vacuo. The thymoxyethoxyethyl-diethanolamine distilled at 233-236° C./5 mm. as a pale yellow oil. Yield 72% of theory.

Its phosphoric acid salt dissolved rapidly in water to give a foamy solution useful as a wetting agent.

The analogous derivative obtained from xylenoxyethoxyethyl chloride, a colorless oil boiling at 168° C./10 mm. which was prepared from 1,3,5-xylenol, caustic soda and $\beta,\beta'$-dichlorodiethyl ether according to the procedure set forth in Example 1, and diethanolamine, was a pale yellow oil boiling at 252° C./10 mm., the hydrochloride of which possesses capillary active properties.

Example 14

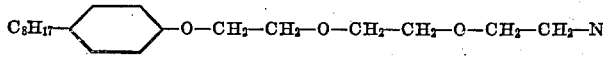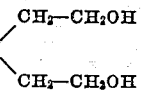

A mixture of 12.3 grams of $\alpha,\alpha,\gamma,\gamma$-tetramethylbutylphenol, 2.7 grams of caustic soda, 5 cc. of water and 64 grams of $\beta$-chloroethyl-$\beta'$-chloroethoxyethyl ether, a colorless oil boiling at 235° C. prepared by treating triethylene glycol in dimethylaniline with thionyl chloride, was heated 5 hours at 110-115 C. while stirring under a reflux condenser. The water was then distilled off, the sodium chloride removed by filtration and the clear filtrate fractionated. The $\beta$(ter-octylphenoxyethoxy)ethyl-$\beta'$-chloroethyl ether distilled as a colorless oil at 199-207° C./3 mm. This was mixed with a molecularly equivalent quantity of diethanolamine and heated 8 hours at 120° C. The base was then liberated by treatment with caustic soda. Its phosphate dissolves readily in water to give a foamy, soapy solution. Upon treatment with diethyl sulfate the water-soluble quaternary ammonium derivative is formed. Its aqueous solution is useful as a wetting-out agent.

In place of the diethanolamine, one can use diethylamine, piperidine, morpholine, dicyclohexylamine or dibenzylamine in the above condensation to obtain the analogous tertiary amines. The water-soluble phosphates, lactates, acetates, and quaternary ammonium salts of these phenol ethers are likewise useful as capillary active compounds.

Example 15

A mixture of 55 grams of p-ter-amylphenoxyethoxyethyl chloride and 7 grams of anhydrous ammonia was heated in an autoclave for three hours at 160-180° C. The reaction product was then boiled under reflux with excess 10% caustic soda solution, and the oil separated and distilled. It boiled over a range of 170-240° C./3mm., and represents a mixture of primary, secondary and tertiary amines in which all the substituent groups are derived from the complex ether chloride.

Example 16

A mixture of 178 grams of p-$\alpha,\alpha,\gamma,\gamma$-tetramethylbutylphenoxyethoxyethyl chloride, 73 grams triethylene tetramine, and 21 grams of sodium hydroxide flakes was stirred and heated at 140-145° C. for from four to five hours. The product was filtered from the residue of sodium chloride. It is a pale yellow oil which can be purified by mixing with twice its volume of cold water, in which it is soluble, and then heating the solution to boiling. The oil is less soluble in hot than in cold water and on heating, separates, leaving any water-soluble impurities in the hot aqueous layer. The final product obtained after drying at 100° C. in vacuo is a pale yellow oil useful as an emulsifying agent for fats, oils, and waxes.

By using 346 grams of p-$\alpha,\alpha,\gamma,\gamma$-tetramethyl butyl phenoxy ethoxyethyl chloride and 42 grams of sodium hydroxide, a similar product is obtained containing two aryloxy polyalkylene ether groups attached to the triethylene tetramine molecule. By heating these products at 100° C. with a mol equivalent of benzyl chloride, quaternary ammonium salts are obtained useful for finishing textiles.

In the same manner, by using diethylene triamine or tetraethylene pentamine, mol for mol, in place of the triethylene tetramine, pale yellow oils are obtained having soap-like properties.

Example 17

A mixture of 381 grams of camphylphenoxy ethoxyethoxyethyl chloride, 189 grams of tetraethylene pentamine, 56 grams of potassium hydroxide, and 400 grams of toluene was boiled under a reflux condenser which was attached to a water trap. After five hours' boiling, no more water came over. The toluene solution was filtered from the residue of potassium chloride and the clear solution evaporated to dryness, eventually under reduced pressure. The product is a pale yellow viscous oil which disperses in water to form a soapy solution useful as a cleansing agent.

Example 18

178 grams of p-$\alpha,\alpha,\gamma,\gamma$-tetramethylbutyl phenoxyethoxyethoxyethyl chloride, 97 grams of piperazine hexahydrate, 22 grams of sodium hydroxide, and 200 grams of toluene were boiled for seven hours, with stirring, under a reflux condenser attached to a water trap until no more water came over. The product was filtered and the clear filtrate evaporated to recover the toluene. The residue was a yellow oil which disperses in water to a soapy solution.

Example 19

A mixture of 413 grams of dodecylphenoxyethoxyethyl chloride, 189 grams of tetraethylene pentamine, and 44 grams of sodium hydroxide was stirred and heated in an open vessel at 140° C. for six hours. The product was filtered hot. On cooling, it formed a yellow oil useful as an emulsifying and textile finishing agent. By using one mol of cetylphenoxyethoxyethyl chloride in place of the dodecyl compound, a similar product was obtained.

Example 20

A mixture of 279 grams o-chlorophenoxyethoxy ethoxyethyl chloride, 103 grams of diethylene triamine, 42 grams of sodium hydroxide, and 300 grams of toluene was boiled, while stirring, under a reflux condenser attached to the water trap. After four hours, no more water came over. The product was filtered and evaporated to dryness in vacuo. It formed a pale yellow oil having insecticidal properties in aqueous dispersion.

*Example 21*

295 grams of β-naphthoxyethoxyethoxyethyl chloride, 104 grams of β-hydroxyethyl ethylene diamine, 106 grams of sodium carbonate, 400 grams of toluene were stirred and boiled for seven hours under a reflux condenser attached to a water trap. The filtered solution was concentrated in vacuo. The product was a pale yellow oil useful as a textile finishing agent.

In a similar manner the following bases were prepared from the arylpolyether chlorides and amines tabulated below—

|  | Product obtained |
|---|---|
| With diethanolamine and— | |
| β-(β-Naphthoxy) ethyl-β'-chloro-ethyl ether (from β-naphthol), B. P. 215–216°/10 mm. | β-Naphthoxyethoxyethyl-diethanolamine oil, B. P. 275–280°/7 mm. |
| β-(o-Benzylphenoxy) ethyl-β'-chloro ethyl ether (from o-benzyl phenol), B. P. 230–233°/10 mm. | o-Benzylphenoxyethoxyethyl diethanolamine oil, B. P. 280–285°/6 mm. |
| β-(o-Cyclohexylphenoy) ethyl-β'-chloroethyl ether (from o-cyclohexylphenol), B. P. 206–209°/10 mm. | o-Cyclohexylphenoxyethoxyethyl diethanolamine oil, B. P. 262°/6 mm. |
| β (p-Cyclohexylphenoxy) ethyl-β'-chloroethyl ether (from p-cyclohexylphenol), B. P. 218–220°/10 mm. | p-Cyclohexylphenoxyethoxy ethyl-diethanolamine oil, B. P. 280–285°/8 mm. |
| β (o-phenylphenoxy) ethyl-β'-chloro-ethyl ether (from o-phenylphenol), B. P. 211–212°/10 mm. | o-phenylphenoxyethoxyethyl-diethanolamine oil, B. P. 275–280°/10 mm. |
| β (p-phenylphenoxy) ethyl β'-chloroethyl ether (from p-phenylphenol), B. P. 185–189°/0.5 mm., M. P. 51°. | p-phenylphenoxyethoxyethyl diethanolamine (resinous mass.) |
| With dibenzylamine and— | |
| β-(p-α,α,γ,γ,-Tetramethylbutyl-phenoxy) ethyl-β'-chloroethyl ether (from p-α,α,γ,γ-tetramethylbutyl-phenol), B. P. 177–178°/4 mm. | p-ter-Octylphenoxyethoxy ethyl-N-dibenzylamine (waxy crystals). |

The water-soluble pentavalent N-derivatives of the above bases, notably their lactates, phosphates, acetates, and the quaternary ammonium salts obtained with benzyl chloride, diethyl sulfate, or dimethyl sulfate are likewise useful as capillary active agents.

Among the uses suggested for such capillary active compounds is their employment as textile assistants in dyeing, bleaching, mercerizing, and mordanting operations; as spreaders for insecticides, dispersing agents for pigments, as wetting and penetrating agents, pickling inhibitors, and assistants in leather tanning and finishing operations. The water-soluble quaternary ammonium salts of the type herein set forth are particularly useful for rendering dyeings with acid, direct, or chrome dyestuffs on rayon, cotton, or on cellulose esters or ethers, faster to light and washings. For this purpose the textile is treated with a solution of the capillary active compound and subsequently dyed in the usual manner.

The quaternary ammonium hydroxides are useful as capillary active compounds in alkaline solution and may be used as mercerizing assistants.

Quaternary ammonium salts such as the chlorides, sulfates, alkyl sulfates, phosphates, bromides, iodides, fluorides, formates, acetates, lactates, citrates, thiocyanates, salicylates, etc. possess bactericidal and fungicidal properties. Dilute solutions containing from one to five parts of salt to a thousand parts of water will kill common plant scales and fungi without injury to vegetation. Such solutions can also be used for destroying plant pests and vermin as well as common pathogenic bacteria, such as colibacteria and staphylococci, in from five to ten minutes, the potency varying with the various members employed.

I claim:

1. An amine having the general formula—

$$R-O-A-O-A-O-A-Z$$

wherein R is an aromatic group of the benzene, diphenyl and naphthalene series attached to the oxygen atom by a nuclear carbon atom, A represents lower alkylene groups of at least two carbon atoms, and Z is an amino radical obtainable by removing a hydrogen atom from a nitrogen of an alkylene polyamine.

2. An amine having the general formula—

$$R-O-A-O-A-O-A-Z$$

wherein R is an aromatic group of the benzene, diphenyl and naphthalene series attached to the oxygen atom by a nuclear carbon atom, A represents lower alkylene groups of at least two carbon atoms, and Z is an amino radical obtainable by removing a hydrogen atom from a nitrogen of a polyalkylene polyamine.

3. An amine having the general formula—

$$R-O-A-O-A-O-A-Z$$

wherein R is an aromatic group of the benzene, diphenyl and naphthalene series attached to the oxygen atom by a nuclear carbon atom, A represents lower alkylene groups of at least two carbon atoms, and Z is an amino radical obtainable by removing a hydrogen atom from a nitrogen of a polyethylene polyamine.

4. An amine having the general formula—

$$R-O-C_2H_4-O-C_2H_4-O-C_2H_4-Z$$

wherein R is an aromatic group of the benzene, diphenyl and naphthalene series containing a nuclear hydrocarbon substituent having at least 4 carbon atoms selected from the group consisting of alkyl, cycloalkyl, aryl, and aralkyl radicals and Z is an amino radical obtainable by removing a hydrogen atom from a nitrogen of a polyalkylene polyamine.

5. The process which comprises condensing an alkylene polyamine with a compound of the formula—$R-(O-A)_n-OA-$halogen wherein R is an aromatic group of the benzene, diphenyl and naphthalene series attached to the oxygen atom by a nuclear carbon atom, A represents lower alkylene groups of at least two carbon atoms, and $n$ represents a number less than three, in the presence of a fixed alkali.

6. The process which comprises condensing a polyalkylene polyamine with a compound of the formula—

$$R-O-C_2H_4-O-C_2H_4-O-C_2H_4-Cl$$

wherein R is an aromatic hydrocarbon group of the benzene, diphenyl and naphthalene series containing a nuclear substituent of at least 4 carbon atoms selected from the group consisting of alkyl, cyclolalkyl, aryl, and aralkyl radicals, in the presence of a fixed alkali.

7. An amine in which an amino hydrogen atom of piperazine has been replaced by the radical—

$C_8H_{17}-C_6H_4-O-C_2H_4-O-C_2H_4-O-C_2H_4-$

8. An amine in which an amino hydrogen atom of tetraethylene pentamine has been replaced by the radical—

$C_8H_{17}-C_6H_4-O-C_2H_4-O-C_2H_4-O-C_2H_4-$

9. An amine in which an amino hydrogen atom of tetraethylene pentamine has been replaced by the radical—

$Camphyl-C_6H_4-O-C_2H_4-O-C_2H_4-O-C_2H_4-$

HERMAN A. BRUSON.